United States Patent

Boutaghou et al.

Patent Number: 5,824,387
Date of Patent: Oct. 20, 1998

[54] MAGNETIC DISC WITH CARBON PROTECTIVE LAYER HAVING REGIONS DIFFERING IN HARDNESS

[75] Inventors: Zine-Eddine Boutaghou, Owatonna; Dallas W. Meyer, Burnsville, both of Minn.; Bo Wei, Daly City, Calif.

[73] Assignee: Seagate Technology, Inc., Scotts Valley, Calif.

[21] Appl. No.: 694,155

[22] Filed: Aug. 8, 1996

Related U.S. Application Data

[60] Provisional application No. 60/011,178, Feb. 25, 1996.

[51] Int. Cl.⁶ ........................................................ G11B 5/82
[52] U.S. Cl. .................. 428/65.5; 428/408; 428/694 TC; 428/694 TR; 428/900; 360/135
[58] Field of Search .................................. 428/65.5, 408, 428/694 TC, 694 TR, 900; 360/135

[56] References Cited

U.S. PATENT DOCUMENTS

| | | | |
|---|---|---|---|
| 5,285,343 | 2/1994 | Tanaka et al. ........................... | 360/131 |
| 5,353,182 | 10/1994 | Nakamura et al. ...................... | 360/104 |
| 5,364,690 | 11/1994 | Takahashi et al. ...................... | 428/212 |
| 5,388,020 | 2/1995 | Nakamura et al. ...................... | 360/135 |
| 5,397,644 | 3/1995 | Yamashita ............................... | 428/408 |
| 5,436,047 | 7/1995 | Howard et al. .......................... | 428/64.2 |
| 5,446,606 | 8/1995 | Brunner et al. .......................... | 360/75 |
| 5,520,981 | 5/1996 | Yang et al. .............................. | 428/65.5 |
| 5,543,203 | 8/1996 | Tani et al. ................................ | 428/156 |
| 5,607,783 | 3/1997 | Onodera ................................ | 428/694 T |
| 5,614,314 | 3/1997 | Itoh et al. ................................ | 428/332 |

OTHER PUBLICATIONS

"Use of Raman Scattering to Investigate Disorder and Crystallite Formation in As–Deposited and Annealed Carbon Films", by R.O. Dillon, J.A. Woollam and V. Katkanant, *Physical Review B*, vol. 29, No. 6, Mar. 1984, pp. 3482–3489.

"Pulsed Laser Treatment of Diamondlike Carbon Films", by S. Prawer, R. Kalish and M. Adel, *Applied Physics Letters*, vol. 48, No. 23, Jun. 9, 1986, pp. 1585–1587.

*Primary Examiner*—Stevan A. Resan
*Attorney, Agent, or Firm*—Westman, Champlin & Kelly, P.A.

[57] ABSTRACT

A magnetic disc for use in a disc drive data storage system is disclosed. The magnetic disc includes a layer of magnetic material deposited on a substrate and a carbon overcoat layer deposited on the layer of magnetic material. The carbon overcoat layer has a first hardness over a contact start-stop region of the disc. The carbon overcoat layer has a second hardness over a data storage region of the disc. The second hardness is softer than the first hardness and than a hardness of a diamond like coating on an associated magnetic head so that disc asperities in the data storage region of the carbon overcoat layer will wear upon impact with the magnetic head.

7 Claims, 1 Drawing Sheet

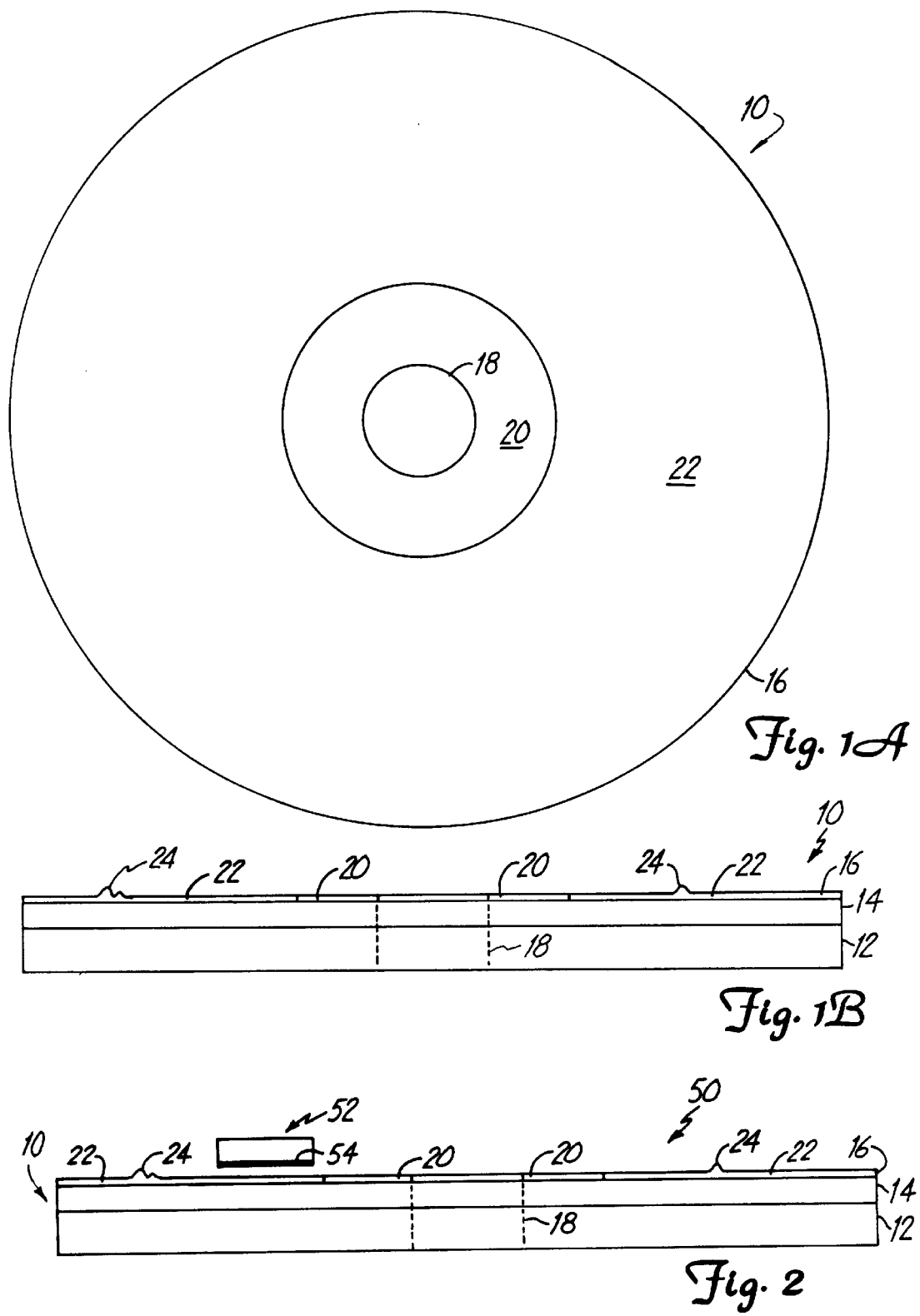

5,824,387

MAGNETIC DISC WITH CARBON PROTECTIVE LAYER HAVING REGIONS DIFFERING IN HARDNESS

BACKGROUND OF THE INVENTION

The present application claims the benefit of earlier filed U.S. Provisional Application Ser. No. 60/011,178, entitled DUAL DISC CARBON COMPOSITION TO REDUCE MR HEAD DAMAGE DURING ASPERITY CONTACT, filed on Feb. 5, 1996.

The present invention relates to magnetic disc drive data storage systems and, more particularly, to a magnetic disc having dual carbon coating compositions to reduce magnetoresistive (MR) head damage during asperity contact.

In operation, the magnetic head of a disc drive data storage system comes into contact with disc asperities in the data storage region of the disc while the MR head flies above the surface of the disc. As is well-known in the art, this contact with disc asperities damages or wears the MR strip of the MR head. Also, significant wear of the MR head and of the magnetic disc occur during contact start-stop (CSS) testing. Manufacturers of disc drive data storage systems have previously made a variety of attempts to reduce the damage to the MR strip during hard asperity contact, and/or to recover from the damage using code error correction schemes. Also, attempts have been made to reduce MR head and magnetic disc wear during CSS testing.

The most popular existing solution to reducing head and disc wear caused by CSS testing or caused by hard asperity contact is to coat both the head and the disc with a very hard diamond-like coating (dlc) of carbon to reduce wear. However, using this method, hard disc asperities are formed in the carbon overcoat layer of the disc. Damage to the MR head's carbon coating can occur when the head impacts a disc asperity. Many of the disc asperities in the carbon overcoat layer will wear down without causing head damage. However, impact with some harder asperities in the carbon overcoat layer of the disc cause substantial head wear and/or damage. Therefore, a new method of protecting the MR head from hard asperity contact is needed.

SUMMARY OF THE INVENTION

A magnetic disc for use in a disc drive data storage system is disclosed. The magnetic disc includes a layer of magnetic material deposited on a substrate and a carbon overcoat layer deposited on the layer of magnetic material. The carbon overcoat layer has a first hardness over a contact start-stop region of the disc. The carbon overcoat layer has a second hardness over a data storage region of the disc. The second hardness is softer than the first hardness and than a hardness of a diamond like coating on an associated magnetic head so that disc asperities in the data storage region of the carbon overcoat layer will wear upon impact with the magnetic head.

BRIEF DESCRIPTION OF THE DRAWINGS

FIG. 1A is a diagrammatic top view of a magnetic disc, in accordance with preferred embodiments of the present invention, which uses a carbon coating having separate hardnesses in the data storage and CSS regions of the disc.

FIG. 1B is a diagrammatic side view illustrating the magnetic disc of FIG. 1 in greater detail.

FIG. 2 is a diagrammatic side view of portions of a disc drive data storage system which illustrates the manner in which the present invention protects the MR head from damage during asperity contact in the data storage region of the disc.

DETAILED DESCRIPTION OF THE PREFERRED EMBODIMENTS

FIGS. 1A and 1B are top and side diagrammatic views, respectively, of magnetic disc 10 in accordance with preferred embodiments of the present invention. Like conventional magnetic discs for use in disc drive data storage systems, disc 10 of the present invention includes substrate 12, magnetic material layer 14, carbon overcoat layer 16, and spindle receiving aperture 18 which extends through layers 12, 14 and 16. Magnetic material layer 14 is deposited on top of substrate 12. Carbon overcoat layer 16 is deposited on top of magnetic material layer 14. The materials used for substrate 12 and magnetic layer 14 are well-known in the art. Further, it is known in the art to use carbon overcoat layer 16 to reduce disc wear during CSS testing and during normal operation of disc 10 in a data storage system.

Disc 10 of the present invention differs from conventional magnetic discs in that carbon overcoat layer 16 is divided into two or more separate regions, each having a different hardness. As illustrated in FIGS. 1A and 1B, carbon overcoat layer 16 is divided into first region 20 and second region 22. Region 20, which corresponds to the CSS region of the disc where a hard carbon overcoat is desired, has a first hardness associated therewith. Region 22, which corresponds to the data storage region of the disc (also known as a flyability region), has a second hardness associated therewith. As in the prior art, disc asperities 24 form in carbon overcoat layer 16 above the data storage region of disc 10.

Because in CSS region 20 a harder carbon overcoat layer is desired to reduce wear during CSS testing, while in data storage region 22 a softer carbon overcoat layer is more beneficial, the hardness associated with region 20 is processed or conditioned to be harder than the hardness associated with region 22.

Thus, region 20 remains hard enough to minimize damage and/or wear to disc 10 during CSS testing. At the same time, the hardness of carbon overcoat layer 16 in region 22 is soft enough such that asperities 24 are softer than the air bearing surface dlc of the MR data head.

Thus all of asperities 24 in region 22 will wear faster than the magnetic head dlc.

FIG. 2 is a diagrammatic side view of disc drive data storage system 50 which includes disc 10 of the present invention and magnetic head 52. The illustration of disc drive data storage system 50 does not include an actuator assembly and other features of disc drive data storage systems which are well known in the art. Omission of these well known features is for ease of illustration and is not intended to limit the scope of the invention in any way. As is known in the art, magnetic head 52 has dlc 54 on its air-bearing surface to protect head 52 during CSS testing. With asperities 24 in data storage region 22 of carbon overcoat layer 16 being softer than dlc layer 54, asperities 24 will wear down upon impact with magnetic head 52. Thus, by making carbon overcoat layer 16 softer in data storage region 22 of disc 10, damage to dlc 54 and to magnetic head 52 in general is prevented. Since dlc 54 will remain substantially intact, the transducers (not shown) of magnetic head 52 are protected from exposure to damage and corrosion.

Magnetic disc 10 of the present invention is preferably fabricated using conventional methods which are well-known in the art. Typically, this will result in carbon overcoat layer 16 being sputter deposited throughout disc 10 on top of magnetic layer 14. After sputter depositing carbon overcoat layer 16 throughout the disc, a laser is preferably used to heat data storage region 22 of carbon overcoat layer 16, causing the carbon overcoat layer to soften in this region. In the alternative, carbon overcoat layer 16 can be exposed to an infrared (IR) or other heat sources in region 22, while CSS region 20 is masked. After heating region 22 to soften carbon overcoat layer 16, the mask is removed from CSS region 20. The result is a magnetic disc having a carbon overcoat layer which is softer over the data storage region of the disc than it is over the CSS region of the disc. Preferably, the carbon overcoat layer is also softer over the data storage region of the disc than is the dlc on the air bearing surface of the magnetic head. Thus, disc asperities in this region of the carbon overcoat layer will wear upon contacting the magnetic head, and not vice-versa. The hardness of the carbon overcoat layer over the CSS region of the disc will preferably remain unchanged and/or will be optimized or chosen for use in CSS testing as is known in the art.

Although the present invention has been described with reference to preferred embodiments, workers skilled in the art will recognize that changes may be made in form and detail without departing from the spirit and scope of the invention.

What is claimed is:

1. A magnetic disc for use in a disc drive data storage system, the magnetic disc having a contact start-stop region and a data storage region, the magnetic disc comprising:

a substrate;

a layer of magnetic material deposited on the substrate; and a carbon overcoat layer deposited on the layer of magnetic material, the carbon overcoat layer comprising:

a first region in which the carbon overcoat layer has a first hardness associated therewith, wherein the first region of the carbon overcoat layer corresponds to the contact start-stop region of the magnetic disc; and a second region in which the carbon overcoat layer has a second hardness associated therewith, the second hardness being softer than the first hardness, wherein the second region of the carbon overcoat layer corresponds to the data storage region of the magnetic disc.

2. The magnetic disc of claim 1, wherein the second region has disc asperities thereon, wherein the second hardness is softer than the first hardness such that the disc asperities in the second region of the carbon overcoat layer are softer than the first hardness.

3. The magnetic disc of claim 2, wherein the first region of the carbon overcoat layer occupies inner diameters of the disc, while the second region of the carbon overcoat layer occupies outer diameters of the disc.

4. A magnetic data storage system comprising:

a magnetic data head, the magnetic data head having an air bearing surface and a diamond-like carbon coating on the air bearing surface forming a first surface having a first hardness associated therewith; and a magnetic disc having a contact start-stop region and a data storage region, the magnetic disc comprising:

a layer of magnetic material; and a carbon overcoat layer deposited on the layer of magnetic material, the carbon overcoat layer having a first region in which the carbon overcoat layer has a second hardness associated therewith, wherein the first region corresponds to the contact start-stop region of the magnetic disc, and the carbon overcoat layer having a second region in which the carbon overcoat layer has a third hardness associated therewith, wherein the second region corresponds to the data storage region of the magnetic disc, the second region having asperities, wherein the third hardness is softer than the first hardness such that the asperities in the second region of the carbon overcoat layer are softer than the first surface of the magnetic data head.

5. The magnetic data storage system of claim 4, wherein the third hardness is also softer than the second hardness.

6. The magnetic data storage system of claim 5, wherein the first region occupies inner diameters of the disc, while the second region occupies outer diameters of the disc.

7. A magnetic disc having a contact start-stop region and a data storage region, the magnetic disc comprising:

a substrate;

a layer of magnetic material deposited on the substrate; and a carbon overcoat layer deposited on the layer of magnetic material, the carbon overcoat layer having a first hardness in the contact start-stop region of the disc and having a second hardness in the data storage region of the disc, wherein the second hardness is softer than the first hardness.

* * * * *

UNITED STATES PATENT AND TRADEMARK OFFICE
CERTIFICATE OF CORRECTION

PATENT NO.    : 5,824,387
DATED         : October 20, 1998
INVENTOR(S)   : Boutaghou et al.

It is certified that error appears in the above-identified patent and that said Letters Patent is hereby corrected as shown below:

<u>Title page,</u>
Item [60], please change the Related U.S. Application Data from "Provisional application No. 60/011,178, filed on Feb. 25, 1996" to
-- Provisional application No. 60/011,178, filed on Feb. 5, 1996 --

Signed and Sealed this

Twenty-third Day of September, 2003

JAMES E. ROGAN
*Director of the United States Patent and Trademark Office*